United States Patent [19]

Kimble et al.

[11] 4,244,091

[45] Jan. 13, 1981

[54] HOSE CRIMPING APPARATUS

[75] Inventors: Jack Kimble, Westminster; Walter W. Paine, Aurora, both of Colo.

[73] Assignee: The Gates Rubber Company, Denver, Colo.

[21] Appl. No.: 77,526

[22] Filed: Sep. 21, 1979

[51] Int. Cl.³ .............................................. B23P 19/04
[52] U.S. Cl. ..................................... 29/237; 29/283.5; 72/36; 72/402
[58] Field of Search ....................... 29/237, 282, 283.5, 29/243.5, 243.52; 72/402, 461, 36

[56] References Cited

U.S. PATENT DOCUMENTS

| 3,568,494 | 3/1971 | Geisman | 29/237 |
| 3,805,580 | 4/1974 | Leiker | 29/237 |
| 3,851,514 | 12/1974 | Chen et al. | 29/237 |
| 4,071,936 | 2/1978 | Smith | 29/237 |

Primary Examiner—James L. Jones, Jr.
Attorney, Agent, or Firm—Curtis H. Castleman, Jr.; Raymond Fink; H. W. Oberg, Jr.

[57] ABSTRACT

An apparatus for crimping a fitting onto a hose end is described of the type having radially directed crimping dies and an associated camming surface, and a ram piston for moving the dies relative to the camming surface causing the dies to displace radially inwardly to effect crimping. A depth stop locating subassembly includes an inner platform on which the hose fitting is placed, an axially adjustable outer platform comovable with the inner platform, and a locator mounted adjacent the outer platform establishing a locating position preselected relative to the crimping dies, to ensure proper depth of crimping by aligning the locator with a gauge element disposed on the outer platform.

10 Claims, 4 Drawing Figures

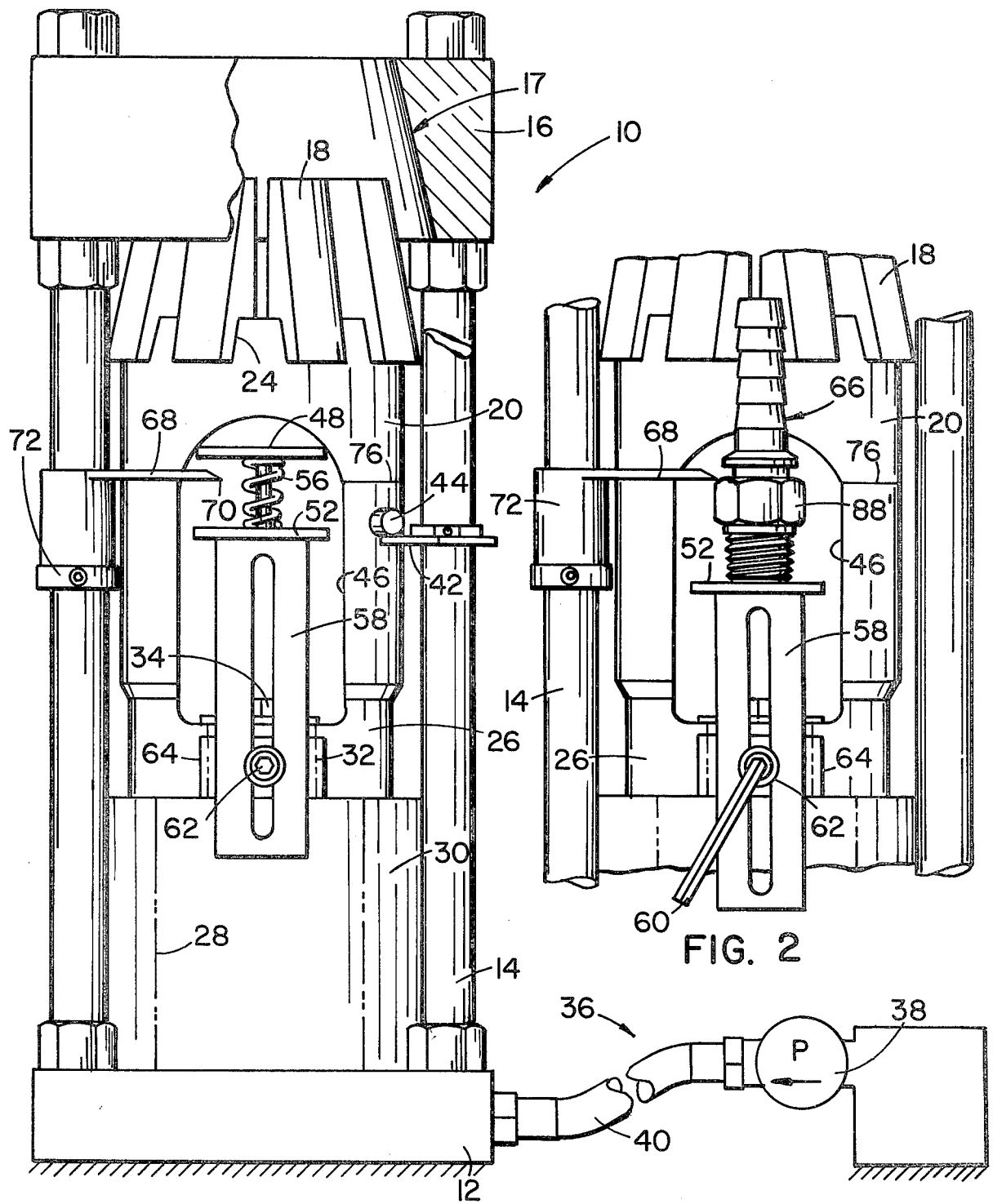

4,244,091

HOSE CRIMPING APPARATUS

BACKGROUND OF THE INVENTION

This invention relates to apparatus for crimping hose fittings, and more particularly to a depth stop locator subassembly which enables crimping at a desired axial position along the fitting.

Apparatus for crimping fittings onto the end of hoses, such as stem/ferrule single or two-piece couplings for hydraulic hose, are well known (see for instance assignee's Brochure No. 35019-N 12/77 "Gates Power Crimp 3000A", Canadian Pat. No. 732,810 and U.S. Pat. No. 3,335,594). To be most effective, the fitting and hose assembly needs to be positioned at the proper depth axially with respect to the adjacent crimping die fingers to ensure that the ferrule is crimped to the full extent desired (lengthwise) while avoiding damage to the rest of the fitting. In the above-mentioned patents visual sighting is apparently the sole technique employed for depth location. In the aforementioned brochure, proper depth could be established in one of two ways. In the first method, the distance from the top of the die finger to the top of the ferrule (positioned on an internal platform) was measured with a rule and compared against known correlations on a chart, for adjustment of the internal platform. Since the measurement was done on the inside of the die cone, there was little room to make the measurement and as a result it was easy to make an incorrect measurement. In the second method, a die finger could actually be removed from the die cage, and a line of sight established so that the depth stop could be adjusted relative to the ferrule. A problem with this method was not only reliance upon visual sighting, but also by the fact that different ferrule diameters would elongate different amounts causing inconsistencies in the finished crimped assembly.

It is an object of the invention to provide a crimping apparatus employing the combination of an internal platform and an external depth stop locator arranged to ensure precision crimping of a hose fitting, in an easy and efficient manner.

SUMMARY OF THE INVENTION

Briefly described, an apparatus is disclosed for crimping a fitting such as a one or two-piece coupling onto a hose, comprising the normal plurality of circumferentially spaced crimping dies, a camming surface against which the dies impinge, an axially disposed inner platform adjustably mounted adjacent the crimping dies beneath the opening between the dies, for receiving the fitting and positioning a crimpable portion thereof between the dies, and means for moving the dies relative to the camming surface to cause the dies to be displaced radially inwardly against the fitting and crimp the same. The improvement comprises particularly an axially adjustment outer platform coupled to and comovable with the inner platform, for disposing thereon a gauge element having an indicating portion bearing a relationship to the fitting to be crimped, and a locator disposed adjacent the outer platform establishing a locating position preselected relative to the crimping dies, adapted and arranged so that upon axial adjustment of the outer platform the indicating portion of the gauge element may be moved into alignment with the locator thereby properly positioning the inner platform relative to the crimping dies for crimping the fitting.

BRIEF DESCRIPTION OF THE DRAWINGS

The invention will be more particularly described in certain of its preferred embodiments by reference to the accompanying drawings, wherein like numerals designate like parts, and in which:

FIG. 1 is a side elevational, partial cutaway view of the crimping apparatus in the rest position;

FIG. 2 is a fragmentary view similar to FIG. 1 showing adjustment of the depth stop by alignment of a gauge element with a locator;

PREFERRED EMBODIMENTS OF THE INVENTION

Figure 3:
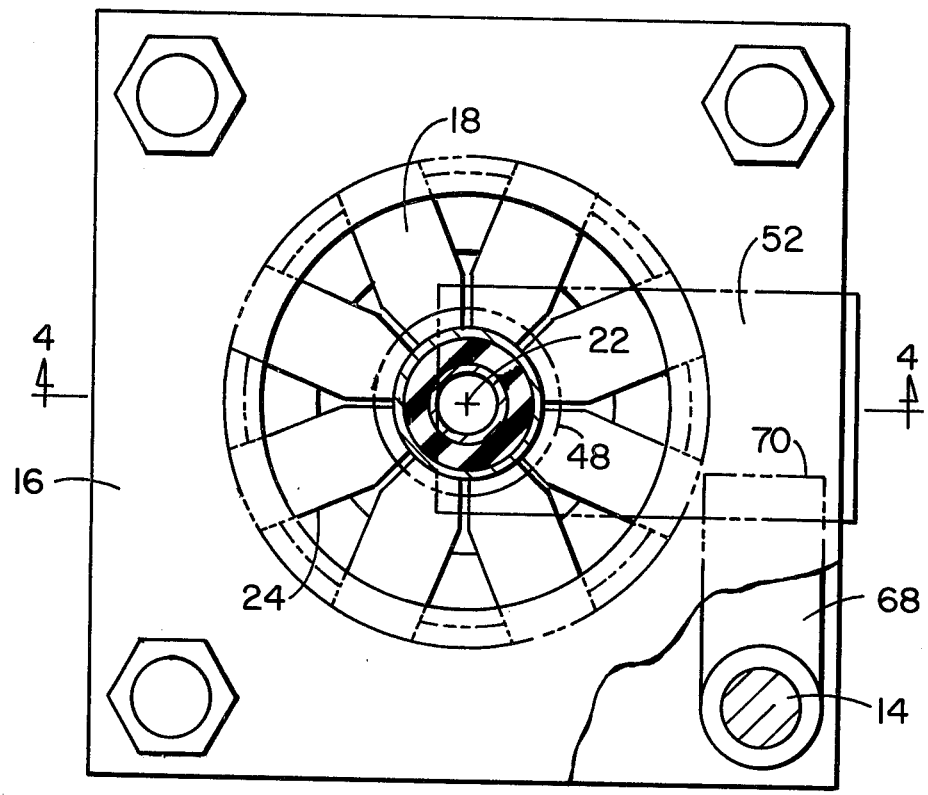
FIG. 3 is a top plan view of the apparatus.

Referring to the figures, the crimping apparatus 10 is interconnected through four corner tie rods 14 to a fixed frustro-conical camming surface 17 forming a part of cam head 16. A plurality of circumferentially spaced crimping dies 18 of truncated wedge shape (as best seen in FIG. 3) are slidably mounted within corresponding slots 24 of die cage 20 for radial inward movement toward axis 22 of the apparatus.

Die cage 20 is of generally cylindrical shape and includes a base portion 26 which is coupled to a piston shown in phantom at 28. The piston forms part of an hydraulic ram 30 integral with cylinder base 12. The piston also includes an extension portion 32 attached to the base 26 of the die cage with lock nut 34 and washer. The ram and piston are actuatable to move the die cage and die assembly axially upwardly to the position shown in FIGS. 3 and 4 by a conventional hydraulic system 36 including pump 38, hydraulic lines 40, and hydraulic fluid. The die cage is retractable with springs or the like (not shown) from the crimping position of FIGS. 3 and 4 to the loading, rest position shown in FIG. 1. To reduce cycle time, the return stroke of the die cage is limited by arm 42 attached to a tie rod, against which die cage protrusion 44 reacts (FIG. 1 only).

The die cage is provided with an enlarged window opening 46 within which the depth stop locator assembly of the invention is positioned. The depth stop includes inner platform 48 disposed along the axis 22 of the apparatus and adapted to receive the end of a hose fitting and assembly 50 to be crimped. The inner platform 48 is coupled directly to and comovable with outer platform 52 through arm linkage 54. The linkage includes spring 56 which biases the two platforms in a predetermined spaced relationship, maintained by lock nuts as shown. The inner and outer platform subassembly is also provided with a slotted upright linkage 58 which is vertically (axially) adjustable with the aid of wrench 60 and allen head bolt 62 secured through a spacer 64 integral with the die cage. As shown in FIG. 2 the outer platform 52 is adapted to receive a gauge element such as fitting (stem) 66 identical with the stem component 51 of fitting 50 to be crimped, exteriorly of the die cage, the details of which will be discussed hereafter with respect to the operation of the apparatus.

The depth stop mechanism also includes a locator means such as locator arm 68 having locating point 70 thereon, exteriorly mounted adjacent the outer platform 52 and adapted to be brought in alignment with an indicating portion of gauge element 66. The locator arm 68 in this embodiment is separate from and resting upon axially adjustable shaft collar 72 which is fixedly attached with a set screw to tie rod 14 at a preselected calibrated position. Specifically, locator point 70 is spaced vertically (axially) from the bottom of die fingers 18 approximately the same distance as the top of platform 48 is spaced vertically from the top of platform 52, when the apparatus is in the rest position of FIG. 1. In actuality, locator point 70 will preferably be spaced closer with respect to the bottom of the die fingers (i.e., raised), by an amount corresponding to one-half the extent of axial expansion the ferrule 74 of the hose fitting undergoes during crimping.

The locating position can alternatively be established by an indicating mark 76 on the die cage, for instance, although use of adjustable arm 68 with a pointer tip as shown is preferred.

In operation, hose fitting 50 is assembled onto the end of hose 78 which may be provided with the usual tube and cover and embedded reinforcement 80. In the case of the two-piece fitting shown, ferrule 74 is first inserted over the end of the hose, and then the threaded male fitting 51 is inserted in the hose end so that the serrated stem 82 is fully inserted with the hose end abutting against stem shoulder 84, and shoulder portion 86 of the ferrule abuts against hex 88 of the fitting 51.

Figure 4:
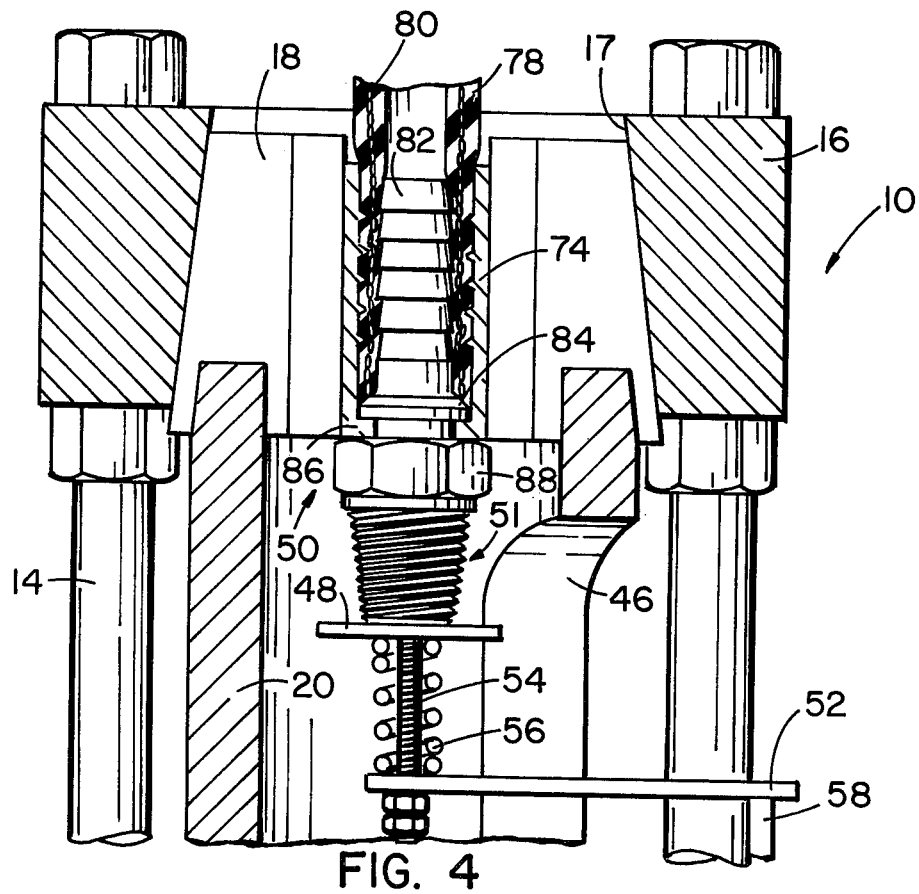
FIG. 4 is a sectional view taken along line 4—4 of FIG. 3, showing a hose fitting being crimped.

To set the depth stop, i.e., platform 48, for proper crimp length gauge element 66 is set on outer platform 52 externally of the die cage, and the platform adjusted vertically with wrench 60 and allen head bolt 62 until locator point 70 is in alignment with an indicating portion of the gauge element. In this case, locator 70 is brought into alignment with the top surface of hex 88', as shown in FIG. 2. With this adjustment having been made, platform 48 is positioned such that the vertical location of the crimping dies along axis 22 is exactly as desired relative to the ferrule 74 upon crimping, as shown in FIG. 4. In most cases, locator point 70 will be calibrated so that the die fingers 18 extend even with the bottom of ferrule 74 when the die fingers are at their radial innermost position so that the full length of the ferrule is crimped. Of course, different types of fittings may dictate a different predetermined positioning of the die fingers relative to the ferrule, and this is accommodated by the apparatus of the invention.

After the depth stop platforms have been set properly, a hose end and fitting assembly 50 is inserted in the opening between the dies with the threaded (bottom) portion of the fitting resting on platform 48 (the gauge element 66 is to be removed from platform 52 and the locator arm 68 may be swung clockwise, out of the way). The pump is now turned on and ram 30 actuated whereby piston 28 moves upwardly against base 26 of the die cage, causing it to displace axially upwardly. As the cam surface of the crimping die fingers 18 impinge upon the stationary camming surface 17 the die fingers are displaced radially inwardly along tracks 24 and against the fitting as shown in FIGS. 3 and 4, to effect crimping of the fitting. The stroke of the piston is set in a control box (not shown) so that the radial extent of crimping is as preselected. Different size die fingers are employed for different categorical sizes of hose and fittings.

It is one feature of the depth stop locator mechanism of the invention that upon crimping of ferrule 74, the ferrule elongates somewhat and spring member 56 preferably absorbs the lengthening of the ferrule and downward displacement of fitting 51. That is, the platform 48 is permitted an axial downward displacement because of its spring loading. This has been found to offer significant advantages over rubber cushions previously used.

The depth stop locator mechanism of the invention possesses a number of advantages over prior art mechanisms. The depth stop may be set much quicker, and the setting is made outside of the machine where ample room is available. The setting particularly for one-piece couplings will also be more accurate. Various types of available crimping machines may be retrofitted with the depth stop locator mechanism of the invention. For instance, the machines described in the above-mentioned patents, which employ a moving cam surface and a fixed die cage may advantageously employ the depth stop mechanism of the invention.

While certain representative embodiments and details have been shown for the purpose of illustrating the invention, it will be apparent to those skilled in this art that various changes and modifications may be made therein without departing from the spirit or scope of the invention.

What is claimed is:

1. In an apparatus for crimping a fitting onto a hose comprising a plurality of circumferentially spaced crimping dies, a camming surface against which the dies impinge, an axially disposed inner platform means adjustably mounted adjacent the crimping dies for receiving the fitting and positioning a crimpable portion thereof between the dies, and means for moving the dies relative to the camming surface to cause the dies to be displaced radially inwardly against the fitting and crimp the same, the improvement comprising:

axially adjustable outer platform means coupled to and comovable with the inner platform means, for disposing thereon a gauge element having an indicating portion bearing a relationship to the fitting to be crimped; and locator means disposed adjacent the outer platform means establishing a locating position preselected relative to the crimping dies, adapted and arranged so that upon axial adjustment of the outer platform means the indicating portion of the gauge element may be moved into alignment with the locator means thereby properly positioning the inner platform means relative to the crimping dies for crimping said fitting.

2. The apparatus of claim 1 wherein the camming surface is fixed, and the means for moving the dies includes a ram coupled to an axially movable die cage having slots therein in which the dies slide radially.

3. The apparatus of claim 2 wherein the die cage has a side opening through which the outer platform is connected to the inner platform.

4. The apparatus of claim 3 wherein the outer platform is adjustably attached to the die cage.

5. The apparatus of claim 1 wherein the outer platform is coupled to the inner platform through a spring linkage which permits the inner platform to undergo limited displacement toward the outer platform during crimping of the fitting.

6. The apparatus of claim 1 wherein the locator means includes a stationary pointer arm mounted to the apparatus.

7. In an apparatus for crimping a fitting onto a hose end comprising a hollow die cage support having radial slots therein, a plurality of circumferentially spaced dies radially movable within the radial slots, a stationary frustro-conical camming surface against which the dies impinge, means for moving the die cage axially to cause the dies to impinge on the camming surface and displace radially inwardly against the fitting to crimp the same, the combination of:

an inner platform for supporting an end of said fitting, positioned along the central axis defined by the crimping dies and interiorly of the die cage;

an outer axially adjustable platform accessible from outside the die cage coupled to and comovable with the inner platform, for disposing thereon a gauge element having an indicating portion bearing a relationship to the fitting to be crimped; and locator means disposed adjacent the outer platform means establishing a locating position preselected relative to the crimping dies, adapted and arranged so that upon axial adjustment of the outer platform means the indicating portion of the gauge element may be moved into alignment with the locator means thereby properly positioning the inner platform means relative to the crimping dies for crimping said fitting.

8. The apparatus of claim 7 wherein the outer platform is coupled to the inner platform through a spring linkage which permits the inner platform to undergo limited displacement toward the outer platform during crimping of the fitting.

9. The apparatus of claim 7 wherein the die cage has a side opening through which the outer platform is connected to the inner platform.

10. The apparatus of claim 7 including means integral with the die cage, and stop means integral with a stationary portion of the apparatus, cooperable to limit the axial displacement of the die cage and thereby reduce cycle time.

* * * * *